US012752490B2

(12) United States Patent
Campbell et al.

(10) Patent No.: US 12,752,490 B2
(45) Date of Patent: Oct. 6, 2026

(54) SYSTEM AND METHOD FOR LOCATING AND JOINING PART SECTIONS ENABLED BY ADDITIVE MANUFACTURING

(71) Applicant: GM GLOBAL TECHNOLOGY OPERATIONS LLC, Detroit, MI (US)

(72) Inventors: Adam John Campbell, Rochester, MI (US); Ali Shabbir, Sterling Heights, MI (US); Dale Miller, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 819 days.

(21) Appl. No.: 18/063,341

(22) Filed: Dec. 8, 2022

(65) Prior Publication Data

US 2024/0190078 A1 Jun. 13, 2024

(51) Int. Cl.

*B29C 64/386* (2017.01)
*B33Y 50/00* (2015.01)
*B33Y 80/00* (2015.01)

(52) U.S. Cl.

CPC ............ *B29C 64/386* (2017.08); *B33Y 50/00* (2014.12); *B33Y 80/00* (2014.12)

(58) Field of Classification Search

CPC ............... Y10T 428/19; Y10T 428/192; Y10T 428/195; Y10T 428/24008; Y10T 428/24174; B32B 1/00; B32B 3/00; B32B 3/26; B32B 3/30; B32B 7/00; B32B 7/04; B32B 7/05; B32B 7/08; B32B 2605/00; B32B 2605/003; B32B 2605/08; A44B 18/00; A44B 18/003; A44B 18/0011; A44B 18/0015; A44B 1/0019; A44B 18/0046; A44B 18/0057; A44B 18/0061; A44B 18/0065; A44B 18/0069

USPC .......... 428/57, 58, 60, 99, 119, 120; 24/442, 24/452, 572.1, 591.1, 595.1, 604, 605, 24/614, 615

See application file for complete search history.

(56) References Cited

U.S. PATENT DOCUMENTS

| | | | | |
|---|---|---|---|---|
| 5,579,562 A * | 12/1996 | Hattori | F16B 5/07 24/442 |
| 2002/0170667 A1 | 11/2002 | Schlueter et al. | |
| 2013/0000089 A1 * | 1/2013 | Lee | G09B 1/30 24/593.1 |
| 2014/0093677 A1 * | 4/2014 | Permesang | E04F 15/02038 428/99 |
| 2014/0244018 A1 | 8/2014 | Bach et al. | |
| 2014/0292013 A1 * | 10/2014 | Colombo | F16B 5/0628 296/29 |
| 2015/0078805 A1 * | 3/2015 | Morris | B62D 27/06 403/13 |

(Continued)

FOREIGN PATENT DOCUMENTS

DE 102018113063 A1 12/2018

*Primary Examiner* — Maria V Ewald
*Assistant Examiner* — Ethan A. Utt
(74) *Attorney, Agent, or Firm* — Ingrassia Fisher & Lorenz, LLP | IFL

(57) ABSTRACT

Systems and methods are provided for printing sections of a part with integral locating and joining features. A system for joining part sections of a part having at least two separate sections includes a locating feature and a joining feature. The locating feature includes structures integrally formed with the sections to locate them relative to one another. The joining feature includes structures integrally formed with the sections to lock the sections together.

19 Claims, 6 Drawing Sheets

(56) References Cited

U.S. PATENT DOCUMENTS

| | | | |
|---|---|---|---|
| 2018/0154555 | A1 | 6/2018 | Ames |
| 2018/0169949 | A1 | 6/2018 | Momose et al. |
| 2019/0161151 | A1 | 5/2019 | Lehman et al. |

* cited by examiner

SYSTEM AND METHOD FOR LOCATING AND JOINING PART SECTIONS ENABLED BY ADDITIVE MANUFACTURING

INTRODUCTION

The present disclosure generally relates to the manufacture of complex three-dimensional parts by additive manufacturing with integral locating and joining features, and more particularly relates to large additive manufactured parts made of multiple sections with locating, joining and other features capable of maintaining surfaces with A-class and B-side integrity.

Additive manufacturing or 3D printing technologies have come into widespread use due to their desirable qualities such as efficiency and flexibility. Various types of 3D printing technologies have been developed for creating objects from metal and polymer materials. The various 3D printing technologies each generally includes a build surface, a material delivery system, an energy delivery system, and a control system. The build surface provides a reference surface upon which the material is deposited, layer-by-layer to successively build up the part according to design details. The material delivery system effects the depositing of a feedstock material, such as in a particle, fiber or filament form, for fusing with the previously deposited layer. The energy delivery system adds energy to the feedstock material before, during and/or after deposition for liquifying/fusing the material into the part being created. The control system operates each of the other systems in building the object being created, such as according to math data definition.

Styling and A-class surface are the terms used in product design that mean the surface of a component is smooth (aesthetic) or visible side to human eye after the part is assembled. An A-surface or A-side surface is a product's visible surface designed with styling objectives to have an aesthetic appearance. The A-surface of a component generally has a smoothly contoured side that is visible to the human eye after the part is assembled to present a surface with curvature continuity. The A-surface may have a selected curvature continuity, texture, and is generally free of features such as process marks, ribs, die marks, irregularities, etcetera. Maintaining the appearance of an A-surface is preferred. Accordingly, a class A surface is a visible surface with an aesthetic look designed to be appealing. A class A surface is manufactured to precisely match three-dimensional math data of a component. The B-surface, is the side of a part opposite its A-surface and may be concealed or partially concealed when assembled into a final product. B-side surface generally have lower aesthetic qualities than A-side surfaces. However, surface quality may be a consideration for certain B-side surfaces.

While additive manufacturing is expanding in use, size limitations exist because printers have a limited sized build volume. Accordingly, large sized parts may not be manufacturable by additive manufacturing. In applications with parts that are larger than would fit in the build volume of an additive manufacturing system, systems and methods to accommodate the size in an efficient and effective manner would provide benefits.

Accordingly, it is desirable to produce large components and parts by additive manufacturing efficiently, while maintaining a high level of locating accuracy and surface quality. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for printing sections of a part with integral locating and joining features. A system for joining at least two separate part sections includes a locating feature and a joining feature. The locating feature includes structures integrally formed with the sections to locate them relative to one another. The joining feature includes structures integrally formed with the sections to securely lock the sections together.

In additional embodiments, the part has a thickness between two surfaces that face in opposite directions. The locating feature and the joining feature are both contained within the thickness between the surfaces.

In additional embodiments, the part has a surface that is complex, meaning the surface curves around approximately ninety-degrees, and the surface has a smooth contour. Plural sections of the part follow the surface over the smooth contour along a seam. The locating feature and the joining feature are both aligned along the seam and are disposed at selected angles to meet dimensional requirements.

In additional embodiments, a plate that engages with the locating feature of at least one of the sections.

In additional embodiments, the plate includes a perimeter and a stepped edge is formed completely around the perimeter.

In additional embodiments, the locating feature comprises a stepped opening in the first section and another stepped opening in the second section.

In additional embodiments, the joining feature include a bar with an enlarged head on one section, and another bar with another enlarged head on the other section.

In additional embodiments, the alignment feature includes a pin on one section and an opening in the other section.

In additional embodiments, the sections comprise portions of the part that are separated in design in advance of being formed by printing by additive manufacturing.

In additional embodiments, the sections are joined at a seam. The joining feature comprises interlocking connectors aligned along the seam that provide a multiplicity of complex locking features mating together along the seam providing a precise locating ability.

In a number of other embodiments, a method includes splitting, prior to forming, a part to have a design with at least two separate sections. A locating feature is formed as locator structures integral with the sections. The locating feature locates the sections relative to one another. A joining feature is formed as lock structures integral with the sections. The joining feature locks the sections together, when the sections are located relative to each other by the locating feature.

In additional embodiments, the part is formed to have a thickness between two surfaces that face in opposite directions. The locating feature and the joining feature are both contained within the thickness between the surfaces.

In additional embodiments, the part is defined to have a surface that is complex, meaning the surface curves around approximately ninety-degrees and has a smooth contour. The sections are formed to follow the surface over the smooth contour along a seam. Both the locating feature and the joining feature are aligned along the seam.

In additional embodiments, a plate engages the locating feature of the sections.

In additional embodiments, a perimeter in included on the plate and a stepped edge is formed completely around the perimeter.

In additional embodiments, a stepped opening in one section and another stepped opening in another section are formed as the locating feature.

In additional embodiments, the joining feature are formed as a bar with an enlarged head on one section and as another bar with another enlarged head on another section.

In additional embodiments, a pin on one section and an opening in another section are included as the alignment feature.

In additional embodiments, the sections are split in design as portions of the part, and in advance of forming the part by printing by additive manufacturing. One section is built from a selected material and the second section is built from a different material, prior to joining the different material sections.

In a number of further embodiments, a part has a design with a complex surface. The design is split into at least two separate sections, defining a seam between the sections along the complex surface. A locating feature includes a structures integrally formed with each of the sections. The structures are configured to locate the sections relative to each other. A joining feature includes additional structures integrally formed with each of the sections. The additional structures are configured to lock the sections together in their relative locations.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
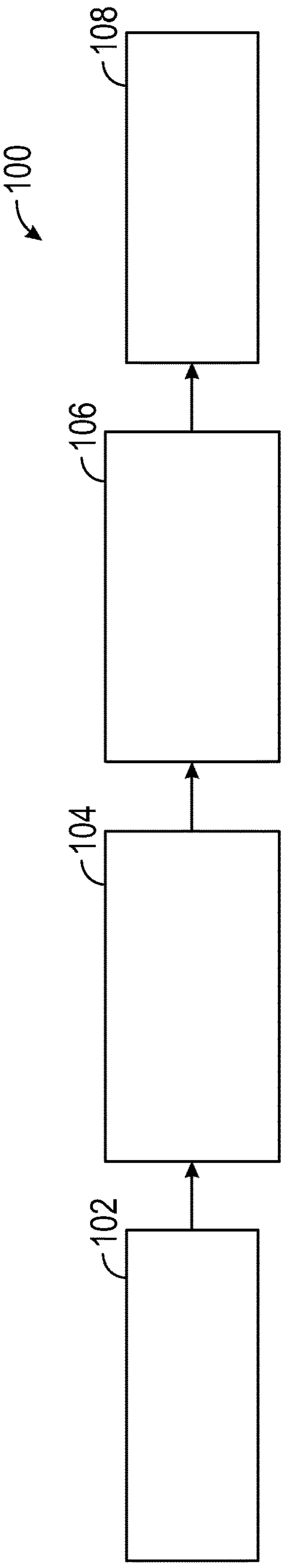
FIG. 1 is a diagram of an additive manufacturing process, in accordance with various embodiments.

Referring to FIG. 1, a process 100 using additive manufacturing is diagrammatically illustrated. In general, the process 100 includes starting with a design of a part to be manufactured and, such as when the part is physically too large to build in one piece, splitting 102 the design into sections defining fragments of the part that will fit in the additive manufacturing machine. For example, the subject part may be defined by three-dimensional math data that may be fragmented into sections. Having split the original math data of the part design into sections, the process 100 includes designing 104 integral locating and joining features into the sections. Because the sections built from the split math data will require joining, the current disclosure takes advantage of additive manufacturing capabilities to include features that facilitate locating, holding, joining and retaining together, the separately printed sections. In the current disclosure, locating features include those structural elements that assist in aligning two or more components relative to one another and positioning them is their intended relative positions for assembly. Joining features include those structural elements that effect securing two or more components together and retaining them in their intended assembled positions relative to one another.

The process 100 includes individually printing 106 the sections including the integral locating and joining features. An additive manufacturing system may also be referred to as a 3D printing system, and generally includes an energy delivery system in the form of heat source, which may be of any heat producing type, a material deposition system, a build chamber with a build platform. In the current embodiment the additive manufacturing process 100 may include a printer of a type additive manufacturing/3D printing system. In other embodiments other additive manufacturing approaches may be used such as stereolithography, digital light process, laser sintering, selective laser melting, laminated object manufacturing, poly-jet, multi-jet fusion, electron beam melting, or others. It will be appreciated that the sections being printed may comprise a polymer material, a metal material, and/or a combination of different types of materials, depending on the design and durability requirements of the part. Accordingly, the 3D printing approach selected may be tailored to the materials selected for forming the sections of the part.

Figure 7:
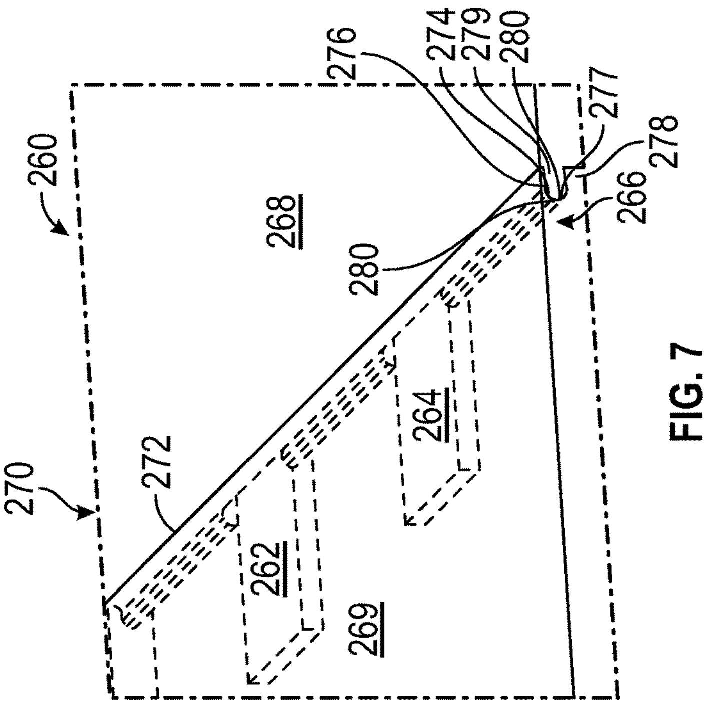
FIG. 7 is a locating and joining system for sections of a part, in accordance with various embodiments.
Figure 10:
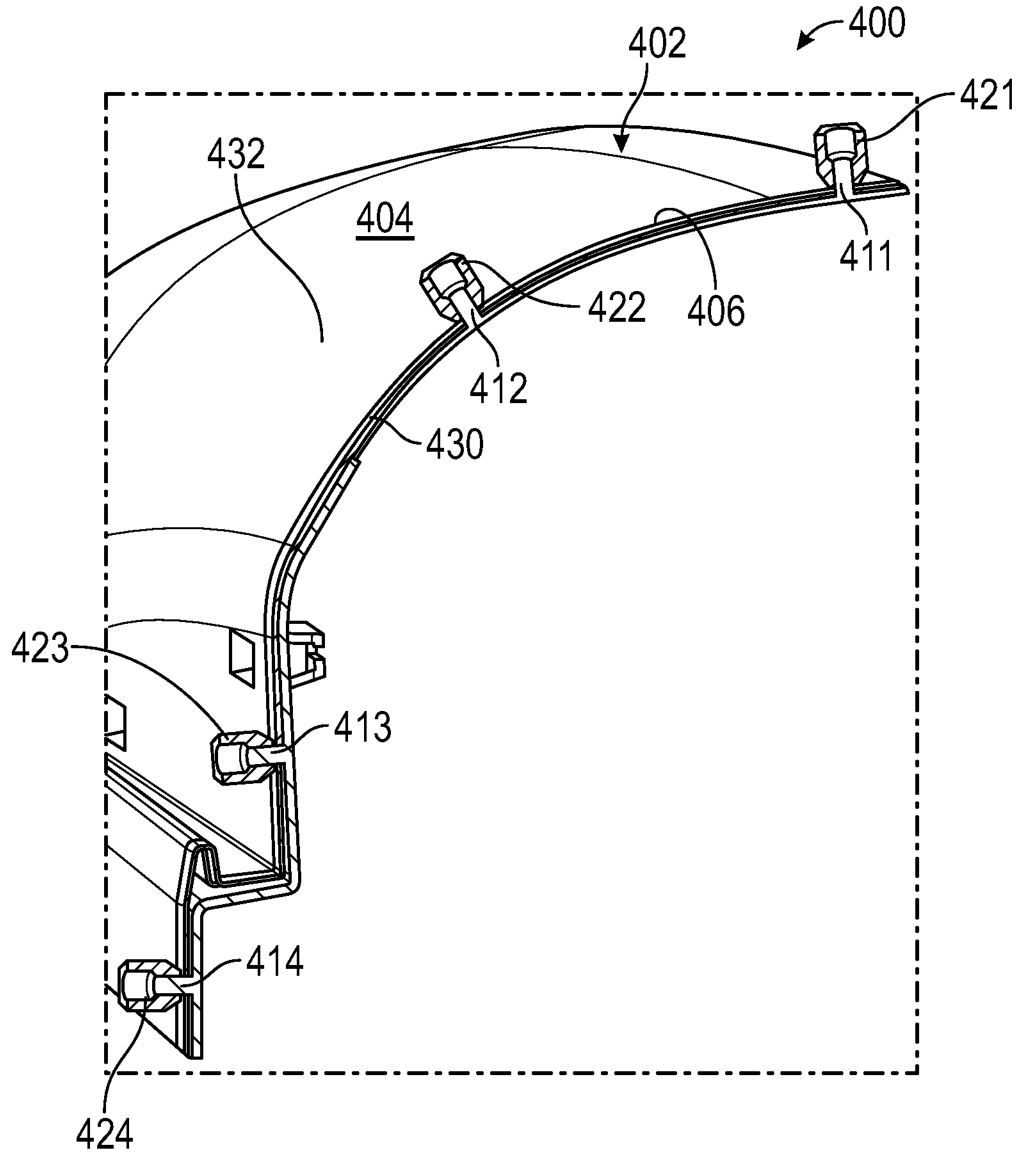
FIG. 10 is a perspective, sectional illustration of a locating and joining system, in accordance with various embodiments.
Figure 11:
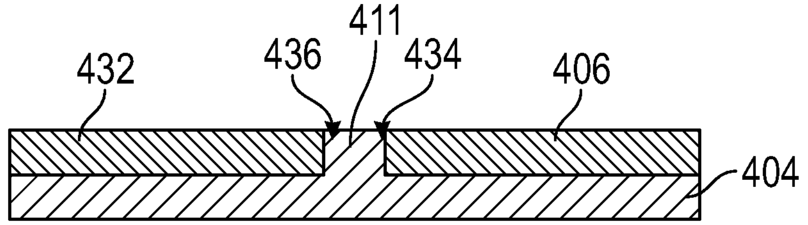
FIG. 11 is a sectional illustration of a fastener area of FIG. 10, in accordance with various embodiments.

The process 100 includes locating and joining 108 the sections of the part printed in the step of printing 106. The integral locating and joining features printed 106 are used to locate the sections of the part relative to one another. The subject part sections may be joined in conjunction with a secondary joining method such as adhesive bonding or ultrasonic welding. For example, a lap joint features (such as shown in FIGS. 7, 10 & 11), provides surface area for bonding the sections or for accepting ultrasonic welds. The printed joining features may be used to secure the part in proper alignment for the secondary joining operation. The integral locating and joining features printed 106 may also be used to secure the sections of the part together, without any additional means of securing the sections together. It should be appreciated that the integral locating and joining features printed 106 may obviate the need for heat or mechanical methods of securing the sections together, avoiding the possibility of creating surface deviations. For example, using welds, adhesives, fasteners, swaging, hemming, crimping, etc., may result in material additions or subtractions that have an effect of the surface quality of the part. By not requiring those additional manufacturing steps, the process 100 results in high quality surfaces on both the A-side and the B-side of the assembled part.

Figure 2:
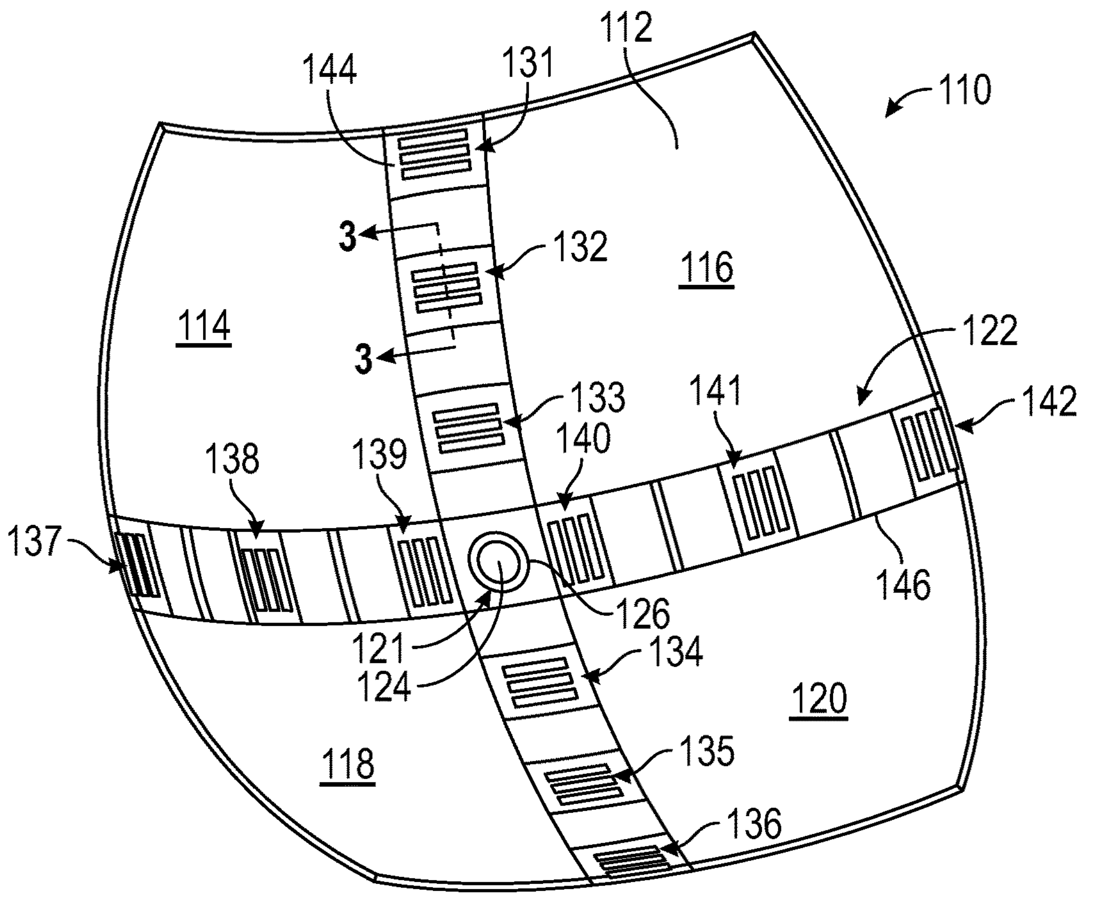
FIG. 2 is a perspective view illustration of a part for building by the process of FIG. 1, in accordance with various embodiments.

Referring to FIG. 2, a part 110 manufactured according to the process 100 is illustrated. In this embodiment, the part 110 has a complex surface 112, meaning the surface 112 is not flat but has smooth contours and a curvature in three-dimensions where any two points selected on the surface 112 vary from each other in each of the three dimensions (e.g., x, y, and z directions). In the current embodiment, the part 110 is fragmented into four sections 114, 116, 118 and 120. The size of the sections 114, 116, 118, 120 is determined by the maximum build surface capacity of the selected additive manufacturing system and the design data of the part 110 is correspondingly fragmented. In this embodiment, the sections 114, 116, 118, 120 are similar in size and shape to one another. In other embodiments, the size and shape of the individual sections chosen may vary depending on the selection of the joining lines and the shape and size of the part.

The part 110 has an integral locating and joining feature system 122 that is printed into the individual sections 114, 116, 118, 120. A locating feature 121 in the form of a pin 124 and hole 126 system is included. Taking advantage of the curvature of the part 110, the "top" section 116 includes the pin 124 and each of the other sections 114, 118, 120 include holes 126. An optional step in assembling the sections 114, 116, 118, 120 is to align the holes 126 of the sections 114, 118, 120 and to then push the pin 124 of the section 116 through the aligned holes 126. This initial location simplifies assembly of the multiple sections 114, 116, 118, 120.

The sections 114, 116, 118, 120 may be made of different materials. The locating and joining feature system 122 provides the benefit that material compatibility for welding or gluing as secondary processes is not required. For example, a nylon section may be included among the sections 114, 116, 118, 120 for cost optimization, stiffness and dimensional stability and a polypropylene section may be included among the sections 114, 116, 118, 120 to enable supplementary parts to be welded to it in desired locations.

Further locating and joining features of the part 110 include multi-dimensional groups of interlocking connectors 131-142. The interlocking connectors 131-142 are aligned along overlapping joints 144, 146 of the sections 114, 116, 118, 120. With the pin 124 in the holes 126, the sections 114, 116, 118, 120 are further assembled by aligning and joining the interlocking connectors 131-142. For example, the interlocking connectors 133, 140, 134, 139 closest to the locating feature 121 may be engaged first, followed by those further away, in order of distance.

Figure 3:
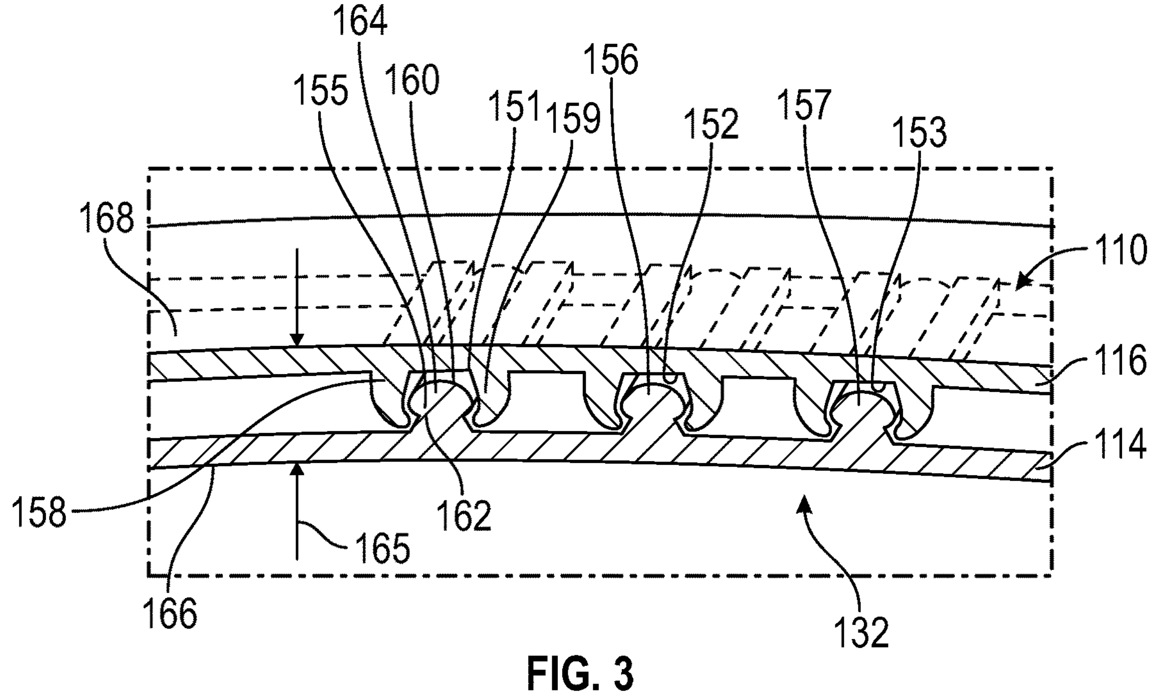
FIG. 3 is a detail illustration of a portion of the assembly of FIG. 2 with sections joined, in accordance with various embodiments.

Details of the interlocking connectors 131-142 are illustrated by the representative set 132 shown in FIG. 3. The locating/connecting features of the interlocking connectors 131-142 may be positioned/disposed at any angle depending on dimensional requirements. In this case, the section 116 includes a set of three receivers 151-153 and the section 114 includes a set of three plugs 155-157 that plug into the receivers 151-153. The receivers 151-153, for example the receiver 151, include parallel curved strips 158, 159 defining a receptacle 160. The plugs 155-157, for example the plug 155, include an elongated bar 162 with an enlarged head 164 that clips into the receptacle 160 and is retained by the curved strips 158, 159. The receivers 151-153 and the plugs 155-157 are disposed within the thickness 165 of the part 110 (e.g., 3 millimeters). Accordingly, the locating and joining features of the part 110 locate, hold and retain the sections 114, 116, 118, 120 together with no additional intrusive joining means. This preserves the surface integrity of the part 110 on both it's A-side 168 and also on its B-side 166.

Figure 5:
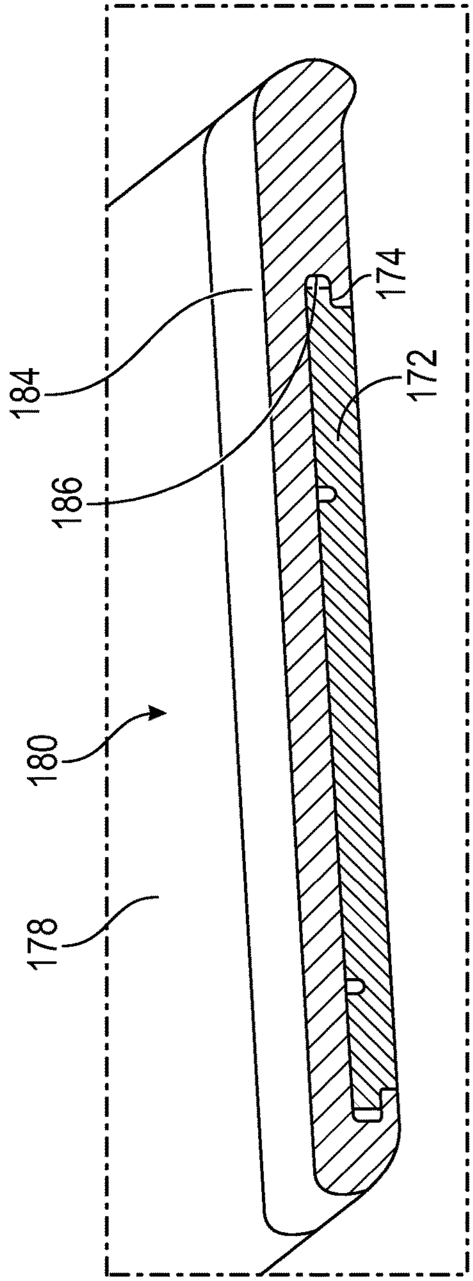
FIG. 5 is a perspective, sectional view including the locating feature of FIG. 4 applied to locate two sections of a part, in accordance with various embodiments.
Figure 4:
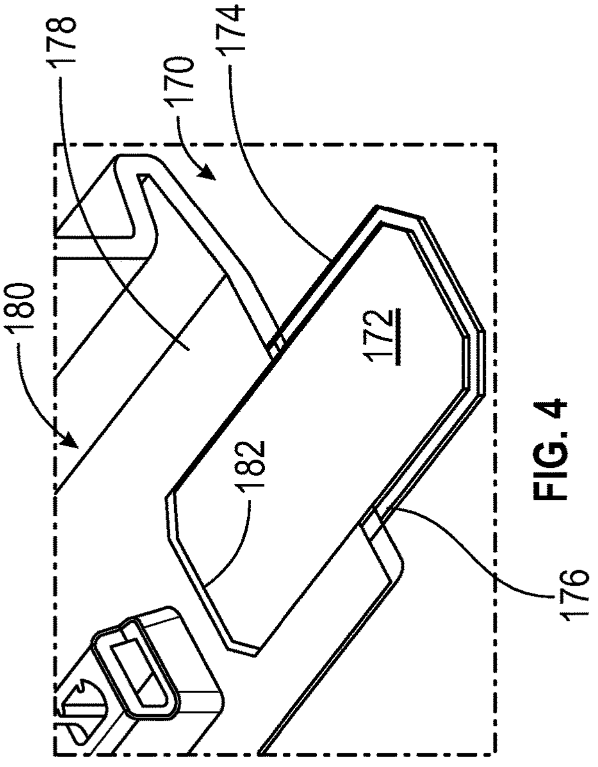
FIG. 4 is a perspective, fragmentary view illustration of a locating feature for two sections of a part, in accordance with various embodiments.

Referring to FIG. 4, a locating system 170 includes a plate 172 that is generally rectangular in shape with chamfered corners and that includes a stepped edge 174 around its entire perimeter 176. The plate 172 is inserted first into one section 178 of a part 180 in a receiver 182 that has a complementary shape. Approximately half of the plate 172 projects from the section 178 for interacting with an adjoining section of the part 180. FIG. 5 shows a part of the adjoined section 184 received over the plate 172. The stepped edge 174 mates with a complementary stepped opening 186 in the section 184, which locates the sections 184 and 178 relative to one another. The stepped edge 174 fits within the stepped opening 186 guiding the sections 178, 184 together as the plate 172 is first inserted into the receiver 182 and the section 184 is then moved over the plate 172. The plate 172 may be fabricated separate from the sections 178, 184, or may be fabricated, such as by printing, integral with one of the sections 178, 184.

Figure 6:
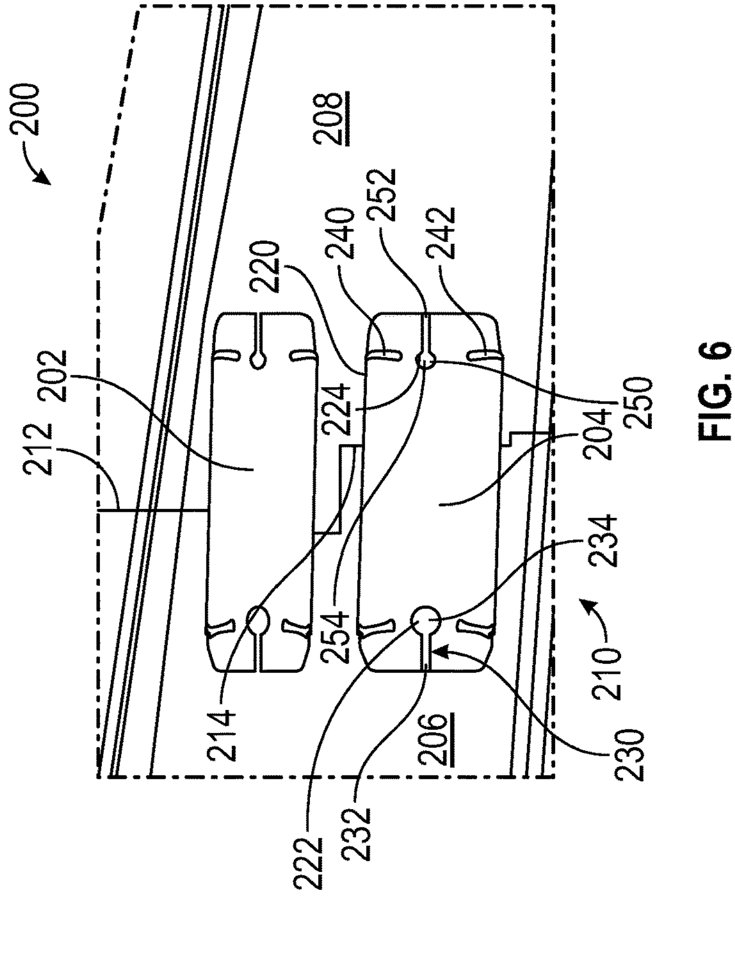
FIG. 6 is a detail, plan view of removeable locating and joining features, in accordance with various embodiments.

Referring to FIG. 6, a locating and joining system 200 includes plates 202, 204, which include both locating and joining features. The plates 202, 204 are illustrated joining two sections 206, 208 of a part 210. Section 206 is printed with a joining edge 212 that is stepped and section 208 is printed with a joining edge 214 that is stepped and shaped to mate with the joining edge 212 to initially locate the section 208 relative to the section 206. During assembly, the plates 202, 204 may be inserted into the section 206 and then the section 208 may be aligned with the joining edge 214 aligned with the joining edge 212 and then the section 208 may be moved onto the plates 202, 204.

The plates 202, 204 include both alignment/locating and joining/retention features. For example, the plates 202, 204 may have stepped edges similar to the embodiment of FIGS. 4-5. The plates 202, 204 re substantially identical but differ in size due to packaging constraints, and so the plate 204 will be described in detail with the understanding that the same/similar features apply to the plate 202. The plate 204 includes a perimeter 220 with a clip opening 222 and another clip opening 224 on its end opposite the clip opening 222. Laterally, relative to the clip opening 222 of the plate 204, are two relief slots 226, 228, which provide a degree of flexibility to the plate 204 around the clip opening 222. When the plate 204 is inserted into the section 206, the relief slots 226, 228 allow the area of the plate 204 around the clip opening 222 to flex. The section 206 includes an integrally printed projection 230 that is received in the clip opening 222. The projection 230 has a bar 232 and an enlarged head 234. The plate 204 includes curved strips that clip around the enlarged head 234 retaining the plate 204 in the section 206.

The plate 204 also includes laterally, relative to the clip opening 224, two relief slots 240, 242, which provide a degree of flexibility to the plate 204 around the clip opening 224. When the section 208 is inserted onto the plate 204, the relief slots 240, 242 allow the area of the plate 204 around the clip opening 224 to flex. The section 208 includes an integrally printed projection 250 that is received in the clip opening 224. The projection 250 has a bar 252 and an enlarged head 254. The plate 204 includes curved strips that clip around the enlarged head 254 retaining the section 208 on the plate 204 and relative to the section 206, without any additional retention means.

A combination, or hybrid location and joining system 260 is illustrated in FIG. 7, to which attention is directed. The location and joining system 260 includes plates 262, 264 and an interlocking connector 266. The plates 262, 264 may be integral lap joint features of section 268. The plates 262, 264 may include any and/or all of the features of the plate 172 described above. The plates 262, 264 provide locating/alignment between the sections 268, 269 of a part 270. In this embodiment, the plates 262, 264 extend from the interlocking connector 266. A seam 272 is disposed between the section 268 and the section 269. The interlocking connector 266 is disposed at the seam 272 and includes a receiver 274 integrally formed with the section 269 and a plug 277 integrally formed with the section 268.

The receiver 274, includes parallel curved strips 276, 278 defining a receptacle 280. The plug 277 includes an elongated bar 279 with an enlarged head that clips into the receptacle 280 and is retained by the curved strips 276, 278. The plates 262, 264 and the interlocking connector align, locate, hold and fasten together the sections 268, 269 over constraining the sections 268, 269 providing elastic averaging that delivers precise positioning, while additive manufacturing allows for unique features such as integral locators and locks. The multiplicity of complex locking features mating together along the seam 272 provides a precise locating ability. Elastic averaging may be used as a specific locating feature.

Figure 8:
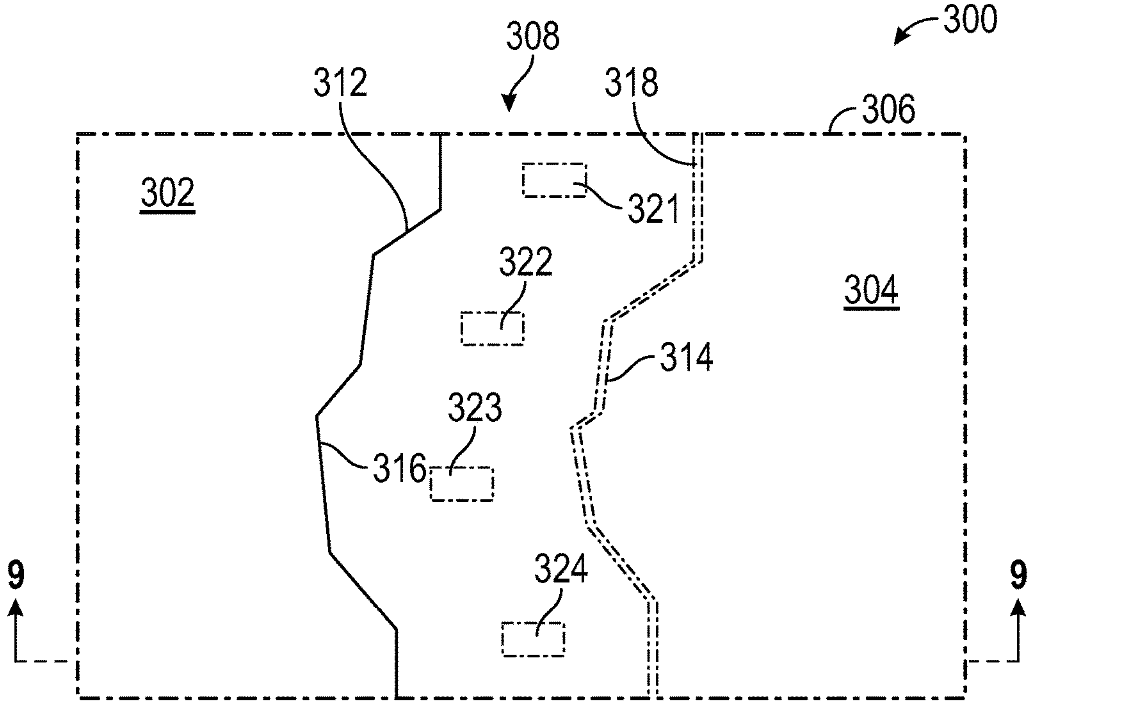
FIG. 8 is a plan view of a locating and joining system, in accordance with various embodiments.
Figure 9:
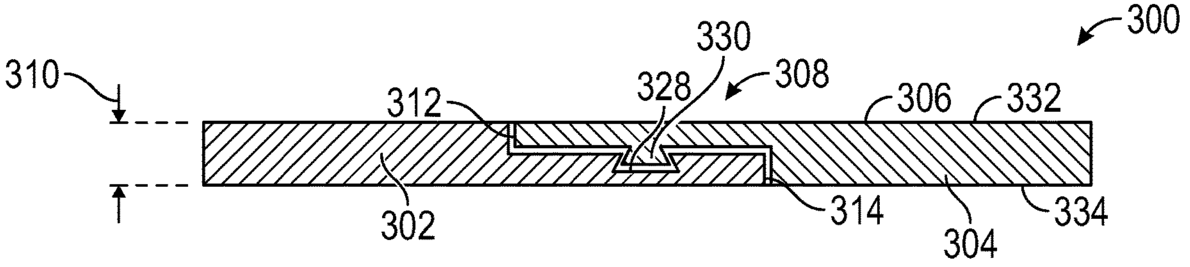
FIG. 9 is a sectional view taken generally through the line 9-9 of FIG. 8, in accordance with various embodiments.

Referring to FIGS. 8 and 9, a location and joining system 300 includes integral printed in features of the sections 302, 304 of the part 306. A seam region 308 between the sections 302, 304 includes a stepped, overlapping structure where the sections 302, 304 extend across one another while maintaining a consistent thickness 310 of the part 306. The seam region 308 is defined between a leading edge 312 of the section 304 and a leading edge 314 of the section 302. The leading edges 312, 314 include stepped profiles to assist in locating the sections 302, 304 relative to one another. When the sections 302, 304 are brought together during assembly, the leading edges 312, 314 overlap and guide the sections 302, 304 into position relative to one another providing a locating function. When the leading edge 312 engages a receiving step 316 of the section 302 and the leading edge 314 engages a receiving step 318 of the section 304, locking features 321-324 may be engaged, which secure the sections 302, 304 together. For example, the locking feature 324 as shown in FIG. 9 includes a receiver opening 328 in the section 302 and includes a plug 330 on the section 304. The plug 330 includes an enlarged head for retention purposes. Engaging the plug 330 in the receiver opening 328 locks the sections 302, 304 together, while the features remain concealed within the thickness 310 of the part 306. This maintains the surfaces 332, 334 in pristine condition with no addition or subtraction to the material thereof.

Referring to FIGS. 10 and 11, an integral locating and joining system 400 includes a part 402 with a section 404 and a section 406. The sections 404, 406 may be separately printed. The section 406 includes integral studs 411-414 that are printed with the section 406 and with threads for receiving nuts 421-424. The part 402 has a complex shape with a substantial curvature of approximately ninety degrees in one dimension and a substantial curvature of approximately ninety degrees in a second dimension. The seam 430 between the sections 404, 406 curves over the approximately ninety degrees and includes bends through additional transitions of approximately ninety degrees. As a result, the sections 404, 406 at the seam 430 define a surface 432 that faces in many different directions in three-dimensional space. Studs 411-414 that project from the surface 432 also extend in four widely varying directions. In a number of embodiments, forming the studs 411-414 integral with the section 404 would be difficult and impractical without the processes of the current disclosure using additive manufacturing of sections. Securing the sections 404, 406 together would also be difficult to impractical without use of the nuts 421-424. The nuts 421-424 include tapered ends that minimize contact with the surface 432, minimizing deformation thereof. When the sections 404, 406 of FIG. 10 are joined secondarily, such as with adhesive, the nuts 421-424 may become bonded to the section(s) 404, 406 following adhesive cure. The minimal surface area of the nuts 421-424 reduces the potential surface area for bonding the nuts 421-424 to the section(s) 404, 406, and facilitates the shearing operation when a nut 421-424 is bonded on a stud(s) 411-414, and must be cut off rather than unscrewed.

Following torqueing of the nuts 421-424, they are removed, such as by being sheared off, leaving a smooth profile to the surface 432. As shown in FIG. 11, following the shearing, the tapered end 434 of the nut 421 may remain embedded in the surface 432 with annular tip 436 remaining on the stud 411, securing the sections 404, 406 together. In addition, a secondary joining method may be used for securing the sections 404, 406 after the nuts 421-424 are sheared off. The integrated fasteners of the studs 411-414 and/or the nuts 421-424 may be used to fixture the sections 404, 406 in place for the secondary joining operation.

Accordingly, printing large parts is enabled by printing sections with integral locating and retaining features, and assembling those sections without deforming part surfaces. All locating and joining features may be contained within the available part thickness with adding to, or subtracting from, the surfaces of the part so that flush surfaces result. In substance, the in-situ features provide location, positioning, holding and joining functions, which described another way, include aligning and locking/retaining. Dimensional inaccuracies and surface deformation is avoided so that the A-side and B-side surfaces of a part match the three-dimensional math data of their design.

Through the embodiments disclosed herein, large parts with complex surfaces may be printed in sections with integral locating and locking features for assembling components, enabling accurate part positioning with preservation of part surface quality. Overconstraining the components and/or elastic averaging delivers more precise component positioning, and additive manufacturing allows for unique features such as integral locators and locks.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes may be made in the function and arrangement of elements and/or steps without departing from the scope of the disclosure as set forth in the appended claims and the legal equivalents thereof.

What is claimed is:

1. A system comprising:

a part having at least two separate sections, including a first section formed of a first single layer of material that has a first surface and a second surface facing away from the first surface, and a second section formed of a second single layer of material that has a third surface and a fourth surface facing away from the third surface;

a locating feature including locator structures integrally formed with at least one of the first section and the second section to locate the first section relative to the second section with the second surface disposed facing the third surface; and a joining feature including lock structures integrally formed with at least one of the first section at the second surface and the second section at the third surface to lock the first section relative to the second section, when the first section and the second section are located by the locator structures, wherein the joining feature including the lock structures is contained within a thickness of a combination of the first section and the second section between the first surface and the fourth surface with no opening through the first surface and the fourth surface at the joining feature so that the first surface and the fourth surface are free of features of the joining feature, meaning the joining feature is not visible at the first surface and the fourth surface, wherein the part comprises the first section, the second section, a third section and a fourth section, configured to be joined along two overlapping joints that cross one another at a point, wherein the locating feature is disposed at the point and is configured to locate the first section, the second section, the third section and the fourth section, wherein the lock structures are distributed along the two overlapping joints.

2. The system of claim 1, wherein:

the locating feature is contained within the thickness between the first surface and the fourth surface.

3. The system of claim 1, wherein:

the first surface and the third surface form a combined surface that is complex, meaning the combined surface curves around approximately ninety-degrees, the combined surface has a smooth contour, both of the first section and the second section follow the combined surface over the smooth contour along a seam, and the locating feature and the joining feature are both aligned along the seam and the lock structures of the joining feature includes sets of interlocking connectors with elongated shapes that are disposed parallel to one another.

4. The system of claim 1, comprising a plate that engages with the locating feature of at least one of the first section and the second section.

5. The system of claim 4, wherein the plate includes a perimeter, wherein a stepped edge is formed completely around the perimeter.

6. The system of claim 1, wherein the locating feature comprises a first stepped opening in the first section and a second stepped opening in the second section.

7. The system of claim 1, wherein the joining feature comprises:

sets of receivers spaced apart from one another on the second surface and mating sets of plugs spaced apart from one another on the third surface, the sets of plugs configured to plug into the sets of receivers, wherein each set of receivers in the sets of receivers includes three receivers and each set of plugs in the sets of plugs includes three plugs;

a bar with an enlarged head constituting each plug in the sets of plugs;

a pair of curved strips disposed parallel to one another and defining a receptacle and constituting each receiver in the sets of receivers, the receptacle configured to receive the enlarged head; and wherein the sets of receivers and the sets of plugs are distributed along the two overlapping joints.

8. The system of claim 1, wherein the locating feature includes a pin on the first section and an opening in the second section.

9. The system of claim 1, wherein the two overlapping joints include a first joint and a second joint, wherein the lock structures distributed along the first joint are parallel to each other, and the lock structures distributed along the second joint are parallel to each other and are not parallel to the lock structures distributed along the first joint.

10. A method for joining part sections, the method comprising:

splitting a part to have at least two separate sections, including a first section and a second section;

forming a locating feature as locator structures integral with the first section formed of a first single layer of material that has a first surface and a second surface facing away from the first surface, and with the second section formed of a second single layer of material that has a third surface and a fourth surface facing away from the third surface;

locating, by the locating feature, the first section relative to the second section with the second surface disposed facing the third surface;

forming a joining feature as lock structures integral with the first section at the second surface and with the second section at the third surface;

locking, by the joining feature, the first section relative to the second section, when the first and second sections are located relative to each other by the locating feature;

containing the joining feature including the lock structures within a thickness of a combination of the first section and the second section between the first surface and the fourth surface with no opening through the first surface and the fourth surface at the joining feature;

maintaining the first surface and the fourth surface free of features of the joining feature, meaning the joining feature is not visible at the first surface and the fourth surface;

joining a third section and a fourth section along with the first section and the second section in the part, along two overlapping joints that cross one another at a point, wherein the locating feature is disposed at the point; and locating, by the location feature, the first section, the second section, the third section and the fourth section, wherein the lock structures are distributed along the two overlapping joints.

11. The method of claim 10, comprising:

containing the locating feature within the thickness between the first surface and the fourth surface.

12. The method of claim 10, comprising:

defining the first surface and the third surface to form a combined surface that is complex, meaning the combined surface curves around approximately ninety-degrees;

defining the combined surface to have a smooth contour;

forming both of the first section and the second section to follow the combined surface over the smooth contour along a seam;

aligning both the locating feature and the joining feature along the seam; and forming the lock structures of the joining feature to include sets of interlocking connectors with elongated shapes that are disposed parallel to one another.

13. The method of claim 10, comprising engaging, with a plate, the locating feature of the first section and the second section.

14. The method of claim 13, comprising including a perimeter on the plate; and forming a stepped edge completely around the perimeter.

15. The method of claim 10, comprising forming, as the locating feature, a first stepped opening in the first section and a second stepped opening in the second section.

16. The method of claim 10, comprising:

constructing the joining feature as sets of receivers spaced apart from one another on the second surface and as mating sets of plugs spaced apart from one another on the third surface;

forming the sets of plugs to plug into the sets of receivers;

including, in each set of receivers in the sets of receivers, three receivers and including, in each set of plugs in the sets of plugs, three plugs;

forming the joining feature as a bar with an enlarged head to constitute each plug in the sets of plugs, and as a pair of curved strips disposed parallel to one another and defining a receptacle and constituting each receiver in the sets of receivers;

receiving, in the receptacle, the enlarged head; and distributing, along the two overlapping joints, the sets of receivers and the sets of plugs.

17. The method of claim 10, comprising including, as the locating feature, a pin on the first section and an opening in the second section.

18. The method of claim 10, comprising:

distributing the lock structures along the two overlapping joints.

19. A system for joining part sections, the system comprising:

a part having a design with a complex surface, the design split into at least two separate sections, including a first section formed of a first single layer of material that has a first surface and a second surface facing away from the first surface, and a second section formed of a second single layer of material that has a third surface and a fourth surface facing away from the third surface, the first section and the second section defining a seam along the complex surface;

a locating feature including a first structure integrally formed with the first section and a second structure integrally formed with the second section, the first structure and the second structure configured to locate the first section relative to the second section with the second surface disposed facing the third surface; and a joining feature including a third structure integrally formed with the first section at the second surface and a fourth structure integrally formed with the second section at the third surface, the third and fourth structures configured to lock the first section relative to the second section, wherein the joining feature including the third and fourth structures is contained within a thickness of a combination of the first section and the second section between the first surface and the fourth surface with no opening through the first surface and the fourth surface at the joining feature so that the first surface and the fourth surface are free of features of the joining feature, meaning the joining feature does not extend through the first surface and the fourth surface, wherein the part comprises the first section, the second section, a third section and a fourth section, configured to be joined along two overlapping joints that cross one another at a point, wherein the locating feature is disposed at the point and is configured to locate the first section, the second section, the third section and the fourth section, wherein the lock structures are distributed along the two overlapping joints, wherein the two overlapping joints include a first joint and a second joint wherein the lock structures distributed along the first joint are parallel to each other, the lock structures distributed along the second joint are parallel to each other and are not parallel to the lock structures distributed along the first joint.

* * * * *